CHARLES ELLING.

Improvement in Machine for Mixing Soap and other Materials.

No. 4,854. Reissued April 9, 1872.

Witnesses.
J. H. Burridge
L. L. Humphrey.

Inventor.
C. Elling.
Per Burridge & Co.
Attys. Cleveland Ohio

UNITED STATES PATENT OFFICE.

CHARLES ELLING, OF CLEVELAND, OHIO.

IMPROVEMENT IN MACHINES FOR MIXING SOAP AND OTHER MATERIALS.

Specification forming part of Letters Patent No. 119,018, dated September 19, 1871; reissue No. 4,854, dated April 9, 1872.

*To all whom it may concern:*

Be it known that I, CHARLES ELLING, of Cleveland, in the county of Cuyahoga and State of Ohio, have invented a new and Improved Machine for Mixing Soap and other Materials, of which the following is a description, reference being had to the accompanying drawing making a part of this specification.

Figure 1:
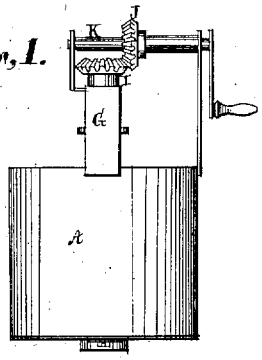
Figure 2:
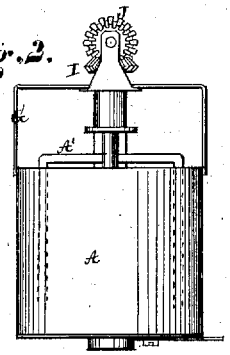
Figure 3:
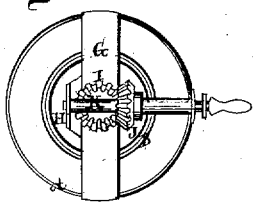
Figure 4:
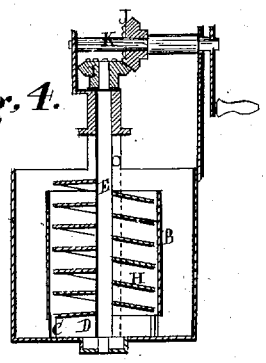
Figure 5:
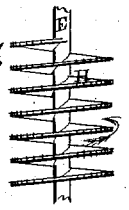

Figures 1 and 2 are side elevations of the machine. Fig. 3 is a plan view. Fig. 4 is a vertical transverse section. Fig. 5 is a detached section.

Like letters of reference refer to like parts in the different views.

The nature of this invention relates to a machine for the manufacture of soap; and the object thereof is to mix up the soap while in a fluid state so as to incorporate therewith no air, and thereby produce a more solid and finer article of soap.

Said machine is constructed and operated in the manner as follows—viz.: In the drawing, Figs. 1 and 2, A represents a vat or tub, in which is a cylindrical case, B, Fig. 4, having an open top and bottom, and which is so arranged in said tub that it is elevated above the floor thereon on standards C, thereby forming a space, D, between the lower end of the case and the floor of the vat, as shown in Fig. 4, the purpose of which will presently be shown. In said case B is erected a shaft, E, having a foot bearing in a step, F, whereas its upper end is supported in a beam, G, Figs. 2 and 3. On the shaft referred to is secured a screw, H, having a broad thin thread, as shown in Fig. 5, the diameter of which is but little less than that of the case in which it is fitted, and made to revolve by means of the miter-wheel I secured to the upper end of the shaft, and which wheel is made to engage a corresponding miter-wheel, J, on the shaft K.

The practical operation of this machine is as follows: The ingredients of the soap, while in an unmixed and fluid condition, are put into the vat for being mixed together, and which mixing is done by turning the screw in direction of the arrow, thereby causing the material to work upward from the bottom through the case, it being carried up by the broad flat surface of the screw revolving in the case and discharging the same over the top, and which is being constantly replaced by the soap from the vat, which finds its way into the case through the space D below. By this means the mixing is done at the bottom of the vat without greatly agitating the surface of the material; hence there is none or but little air mixed up with the soap, so that it is less spongy and frothy when mixed ready for being molded. By this manner of mixing a harder and more solid soap is obtained than when the soap is mixed up in the ordinary manner, agitating it in such way as to expose it to the air, which, being incorporated therewith, makes the soap porous and soft.

In this process of mixing there is established a current of soap from the bottom of the vat to the top of the inside of the case, over which it pours into the vat again, during which time it is thoroughly stirred and mixed up ready for the molds. By reversing the action of the screw current is caused from the top to the bottom, which, however, is not so favorable in its results as when the mixture is worked upward from the bottom.

A is a pair of arms, whereby the mixture is prevented from becoming set in the vat as the arms pass through, thereby keeping it in motion.

When the mixing of the soap is completed it is drawn off through the bottom, an opening being made therein for that purpose, which, when not in use, is closed by a slide, B.

This machine can be employed equally well for mixing other compounds, or paints, concrete, mortar, and other like compositions requiring mechanical action for their combination.

*Claims.*

What I claim as my invention, and desire to secure by Letters Patent, is—

1. The tub or vat A and cylindrical case B, constructed with open ends, arranged in said tub so that its lower end shall be above the bottom thereof, substantially in the manner as described, and for the purpose set forth.

2. The vat or tub A, cylindrical case B, and screw H, as arranged in relation to each other, and operating in the manner substantially as described, and for the purpose set forth.

3. Arms A′, as arranged in combination with the shaft E and in relation the cylindrical case B and tub or vat A, as described, and for the purpose specified.

CHARLES ELLING.

Witnesses:
J. H. BURRIDGE,
D. L. HUMPHREY.